US005431843A

United States Patent [19]

Mitchell et al.

[11] Patent Number: 5,431,843

[45] Date of Patent: Jul. 11, 1995

[54] CLEANING THROUGH PERHYDROLYSIS CONDUCTED IN DENSE FLUID MEDIUM

[75] Inventors: James D. Mitchell, Alamo; Vincent E. Alvarez, Livermore; Daniel T. Carty, Danville; James R. Latham, Livermore, all of Calif.

[73] Assignee: The Clorox Company, Oakland, Calif.

[21] Appl. No.: 754,809

[22] Filed: Sep. 4, 1991

[51] Int. Cl.[6] .......................... C09K 3/00; D06L 1/00

[52] U.S. Cl. .......................... 252/186.38; 252/186.3; 134/30; 134/34; 8/142

[58] Field of Search .......................... 252/186.38, 186.41, 252/186.3; 134/30, 34; 8/142

[56] References Cited

U.S. PATENT DOCUMENTS

| | | | |
|---|---|---|---|
| 3,969,196 | 7/1976 | Zosel | 203/49 |
| 3,974,082 | 8/1976 | Weyn | 252/95 |
| 4,012,194 | 3/1977 | Maffei | 8/142 |
| 4,013,575 | 3/1977 | Castrantas et al. | 252/104 |
| 4,219,333 | 8/1980 | Harris | 8/137 |
| 4,308,200 | 12/1981 | Fremont | 260/110 |
| 4,412,934 | 11/1983 | Chung et al. | 252/186.38 |
| 4,483,778 | 11/1984 | Thompson et al. | 252/94 |
| 4,681,529 | 7/1987 | Hardy et al. | 8/111 |
| 4,778,618 | 10/1988 | Fong et al. | 252/186.23 |
| 4,820,537 | 4/1989 | Katz | 426/481 |
| 4,859,800 | 8/1989 | Zielske et al. | 586/566 |
| 4,867,997 | 9/1989 | Wiesenberger et al. | 426/387 |
| 4,892,673 | 1/1990 | Dixit et al. | 252/114 |
| 4,956,117 | 9/1990 | Zielske et al. | 252/186.38 |
| 4,957,647 | 9/1990 | Zielske | 252/186.38 |
| 4,959,187 | 9/1990 | Fong et al. | 260/402 |
| 5,002,691 | 3/1991 | Bolkan et al. | 252/186.25 |
| 5,013,366 | 5/1991 | Jackson et al. . | |
| 5,030,240 | 7/1991 | Wiersema et al. | 8/111 |
| 5,179,021 | 1/1993 | du Manoir et al. | 435/278 |
| 5,267,455 | 12/1993 | Dewees et al. | 34/72 X |
| 5,279,615 | 1/1994 | Mitchell et al. | 134/126 X |
| 5,370,742 | 12/1994 | Mitchell et al. | 134/10 |

FOREIGN PATENT DOCUMENTS

| | | | |
|---|---|---|---|
| 253487 | 1/1988 | European Pat. Off. | C11D 3/39 |
| 359087 | 3/1990 | European Pat. Off. | C11D 3/386 |
| 390393 | 10/1990 | European Pat. Off. | C11D 3/39 |
| 396287 | 11/1990 | European Pat. Off. | C11D 3/39 |
| 3904513 | 8/1990 | Germany | A61L 2/16 |
| 3904514 | 8/1990 | Germany | D06L 1/00 |
| 4004111 | 8/1990 | Germany | D06L 1/00 |
| 3906724 | 9/1990 | Germany | D06P 1/00 |
| 3906735 | 9/1990 | Germany | D06L 3/00 |
| 90/06189 | 6/1990 | WIPO . | |

OTHER PUBLICATIONS

H. Brogle, "$CO_2$ in Solvent Extraction," *Chem. and Ind.*, pp. 385-390 (1985).

"Supercritical Fluids," *Kirk-Othmer Encycl. Chem. Tech.*, 3rd Ed., Suppl., vol. 24, pp. 872-893 (1983).

K. Poulakis et al., "Dyeing Polyester in Supercritical $CO_2$," *Chemiefasern/Textilindustrie*, vol. 41/93, Feb., 1991.

"Carbon Dioxide," *Kirk-Othmer Encycl. Chem. Tech.*, 3rd Ed., vol. 4, pp. 715-742 (1978).

A. Francis, "Ternary Systems of Liquid Carbon Dioxide," pp. 1099-1114 (1954).

J. Hyatt, "Liquid and Supercritical Carbon Dioxide as Organic Solvents," *J. Org. Chem.*, vol. 49, pp. 5097-5100 (1984).

Technical Support Package, "Cleaning with Supercritical $CO_2$," NAPA Tech Briefs MFS-29611.

K. Motyl, "Cleaning Metal Substrates Using Liquid Supercritical Fluid Carbon Dioxide," RFP-4150 (1988).

"Supercritical Fluids Attracting New Interest," *Inform*, vol. 1, pp. 810-816 (1990).

(List continued on next page.)

*Primary Examiner*—Gary Geist
*Assistant Examiner*—Valerie Fee
*Attorney, Agent, or Firm*—Joel J. Hayashida; Michael J. Mazza; Harry A. Pacini

[57] ABSTRACT

The invention provides a cleaning agent and method for removing stains from fabrics comprising a combination of dense gas, a source of hydrogen peroxide and an organic bleach activator therefor.

19 Claims, 1 Drawing Sheet

OTHER PUBLICATIONS

M. Cygnarowicz et al., "Effect of Retrograde Solubility on the Design Optimization of Supercritical Extraction Processes," *Ind. Eng. Chem. Res.*, vol. 28, pp. 1497–1503 (1989).

"Hydrocarbons (Survey)," *Kirk–Othmer Encycl. Chem. Tech.*, vol. 12, pp. 870–937 (1980).

B. Brady et al., "Supercritical Extraction of PCB Contaminated Soils."

B. Brady et al., "Supercritical Fluid Extraction of Hazardous Waste from Contaminated Soils," 1985.

M. Cygnarowicz et al., "Design and Control of a Process to Extract beta–Carotene with Supercritical Carbon Dioxide," *Biotech Prog.*, vol. 6, pp. 82–91 (1990).

H. Vollbrecht, "Advantages and Limitations of the $CO_2$ High Pressure Extraction Process for Extracting Natural Raw Material in Large Scale Production," pp. 269–273.

M. Cygnarowicz et al., "Equilibrium Solubilities of Beta–Carotene in Supercritical Carbon Dioxide," *Fluid Phase Equilibrium,* pp. 1–18, 1990 (In Press).

L. Tillman et al., "Pulping of Southern Pine Under Low Water, Alkaline Conditions Using Supercritical Carbon Dioxide–Sulfur Dioxide Mixes," *TAPPI J.,* pp. 140–146 (1990).

P. Gallagher et al., "Supercritical Processing of Polymers," pp. 668–670.

B. Subramanian et al., "Reactions in Supercritical Fluids," *Ind. Eng. Chem. Process. Des. Div.,* vol. 25, pp. 1–12 (1986).

V. Krukonis, "Processing with Supercritical Fluids," pp. 26–43 (1988).

CLEANING THROUGH PERHYDROLYSIS CONDUCTED IN DENSE FLUID MEDIUM

BACKGROUND OF THE INVENTION

1. Field of the Invention

The invention provides a method and composition for cleaning, e.g., the removal of stains from fabrics, by using a combination of a dense gas, such as densified carbon dioxide, a source of hydrogen peroxide and an organic bleach activator therefor, the combination providing a source of organic peracid.

2. Brief Statement on Related Art

There has been limited recognition in the use of carbon dioxide for cleaning. Carbon dioxide has been used as a standard propellant in the delivery of foaming cleaning products, e.g., Harris, U.S. Pat. No. 4,219,333.

Maffei, U.S. Pat. No. 4,012,194, described a dry cleaning system in which chilled liquid carbon dioxide is used to extract soils adhered to garments. The liquid carbon dioxide is converted to gaseous carbon dioxide, the soils removed in an evaporator and the gaseous carbon dioxide is then recycled. Maffei, however, does not teach, disclose or suggest the use of additional cleaning adjuncts in connection with his chilled liquid carbon dioxide dry cleaning system.

More recently, the use of supercritical fluids, e.g., carbon dioxide whose temperature has been elevated to past a so-called critical point, has been studied for the purposes of solvent extraction, as in, e.gs., Kirk-Othmer, Encycl. of Chem. Tech., 3d Ed., Vol. 24 (Supplement), pp. 872–893 (1983) and Brogle, "$CO_2$ in Solvent Extraction," *Chem. and Ind.*, pp. 385–390 (1982). This technology is of high interest because of the need for little or no organic solvents in such extraction processes, which is very desirable from an environmental standpoint.

However, none of the prior art discloses, teaches or suggests the combination of dense gas, a source of hydrogen peroxide and an organic bleach activator therefor as a cleaning agent. Nor does the art teach, disclose or suggest the use of such combination of densified carbon dioxide, a source of hydrogen peroxide and an organic bleach activator therefor in a dry cleaning process, the novel combination providing an environmentally safe alternative to the use of ordinary dry cleaning materials such as Stoddard solvent or perchloroethylene ("perc").

SUMMARY OF THE INVENTION AND OBJECTS

The invention provides, in one embodiment, a method for cleaning comprising:

contacting said stains with a dense gas, a source of hydrogen peroxide and an organic bleach activator therefor.

In a further embodiment is provided a cleaning agent for cleaning comprising a mixture of dense gas, a source of hydrogen peroxide and an organic bleach activator therefor.

It is therefore an object of this invention to provide a novel cleaning agent which uses a combination of a dense gas, a source of hydrogen peroxide and an organic bleach activator therefor.

It is another object of this invention to provide a method for the dry cleaning of fabrics while avoiding significant use of such solvents as perchloroethylene and Stoddard solvent, or similar hydrocarbon Solvents.

It is yet another object of this invention to clean stained fabrics with a combined densified carbon dioxide/perhydrolysis system which has better performance than dense carbon dioxide alone.

It is a still further object of this invention to clean any surface, or any substance, by using a combination of dense gas a perhydrolysis system containing an organic activator and a source of hydrogen peroxide.

DETAILED DESCRIPTION OF THE PREFERRED EMBODIMENTS

The invention provides a cleaning agent and method for removing stains from fabrics comprising a combination of dense gas, a source of hydrogen peroxide and an organic bleach activator therefor.

As noted above, a particularly preferred application of the invention is in the use of the cleaning admixture for the nonaqueous cleaning of stained fabrics commonly known as dry cleaning.

Dry cleaning is conducted primarily by small businesses, many of which have been in operation for many years prior to the onset of stringent environmental legislation regarding the use and disposal of organic solvents, e.g., perc and Stoddard solvent. Because of the ever-growing concern that ground waters may become contaminated by the widescale use of such solvents and because of the health risks of the solvents acting as possible carcinogens, much of this new legislation has been promulgated to regulate such use and disposal. Consequently, there is a great need for alternate ways of cleaning fabrics avoiding the use of such solvents, while obtaining effective cleaning for garments and other fabrics for which aqueous washing is contraindicated.

In the present invention, it has been found that using dense gases to essentially deliver a peracid from a perhydrolysis system has unique benefits. For example, a generated peracid is generally a stronger oxidant than such common oxidant bleaches as sodium perborate, or other peroxides.

Moreover, the generated peracid can effectively remove diverse stains at relatively low concentrations of peracid.

And, in the case of surface active peracids, such generated peracids will actually be fabric substantive, leading to better soil removal.

Next, because the organic bleach activator can be embedded in the fabric to be cleaned, pretreatment of the stained fabric can be achieved, allowing "targetting" of stains.

Also, because the organic bleach activator is much more stable than its equivalent peracid, the release of the generated peracid is controllable and can be delayed or "metered" as desired.

Finally, as indicated hereinbefore, organic peracids are unstable, volatile compounds and keeping them in storage is very problematic. By using the predecessor organic bleach activator, typically, a very stable ester, storage and stability are very advantageous versus the generated peracid. Thus, when the peracid is actually generated, one can have the peracid available at "full strength."

In the present invention, numerous definitions are utilized:

"Densified carbon dioxide" means carbon dioxide, normally a gas, placed under pressures generally exceeding preferably 800 psi at standard temperature (21° C.).

"Organic Bleach Activator" and "Peracid Precursor" are considered synonymous terms and describe organic compounds, typically carbonyl compounds, such as, without limitation, esters, nitriles, imides, oximes, carboxylic acids, acid anhydrides, and the like, which, in the presence of a source of hydrogen peroxide, typically, in an aqueous medium, react to form a corresponding organic peracid. Additionally, as described hereinbelow, these terms encompass the phenomenon of enzymatic perhydrolysis in which a normally poor activator, e.g., a triglyceride, can be catalyzed by the use of an esterase (e.gs., lipase or protease) in the presence of hydrogen peroxide to generate peracid. Since the peracid is generated in the presence of an enzyme, this type of perhydrolysis is referred to as enzymatic perhydrolysis.

"Supercritical" phase means when a substance, such as carbon dioxide, exceeds a critical temperature (e.g., 31° C.), at which point the material cannot be condensed into the liquid phase despite the addition of further pressure.

Reference is made to co-pending U.S. patent application Ser. No. 07/715,299, filed Jun. 14, 1991, entitled METHOD AND COMPOSITION USING DENSIFIED CARBON DIOXIDE AND CLEANING ADJUNCT TO CLEAN FABRICS, of James D. Mitchell now U.S. Pat. No. 5,279,615, whose entire disclosure is incorporated wholly by such reference thereto.

1. Dense Gas

The term dense gas applies to gases which are subjected to greater than usual (atmospheric) pressure or lower than usual temperature (room temperature, 21.1°C.) to enhance its density.

A preferred gas for densification is carbon dioxide. Carbon dioxide ($CO_2$) is a colorless gas which can be recovered from coal gassification, synthetic ammonia and hydrogen gėneration, fermentation and other industrial processes. (*Kirk-Othmer, Encycl. Chem. Tech.*, 3rd Ed., Vol. 4, pp. 725–742 (1978), incorporated herein by reference thereto.)

In the invention, densified carbon dioxide is used as a cleaning agent for removing soils and stains from fabrics, in conjunction with the perhydrolysis mixture. Densified carbon dioxide is carbon dioxide which has been placed under greater than atmospheric pressure or low temperature to enhance its density. In contrast to carbon dioxide used in pressurized cannisters to deliver foamed products, e.g., fire extinguishers or shaving creams, densified carbon dioxide is preferably at much greater pressures, e.g., 800 p.s.i. and greater. It has been found that density, rather than temperature or pressure alone, has much greater significance for enhancing the solvent-like properties of carbon dioxide. See, H. Brogle, 2 as a "CO Solvent: its Properties and Applications, "*Chem. and Ind.*, pp. 385–390 (1982), incorporated by reference thereto.

Types of dense gases which would be of utility herein includes densified carbon dioxide, supercritical carbon dioxide and liquid carbon dioxide. The concept of dense carbon dioxide encompasses these other types of carbon dioxides. Other supercritical fluids appear suitable for use as dense gases, and include liquids capable of gassification, e.gs., ammonia, lower alkanes ($C_{1-5}$) and the like.

The amount, or volume, of densified carbon dioxide or other supercritical fluid would depend on the type of substrate, temperature and pressure involved, as well as the volume of the container for such densified gas. Generally, an amount which is effective to remove the stain is used. Thus, for the purposes of this invention, cleaning-effective amounts are used.

2. Perhydrolysis System

By itself, densified carbon dioxide has relatively poor soil removal performance. Surprisingly, applicants have discovered that the addition of a source of hydrogen peroxide and an organic bleach activator therefor can unexpectedly improve the removal of soils. This is surprising considering that dense gas by itself may not necessarily be very effective at removing such soils from fabrics.

The perhydrolysis system comprises two essential components: a source of hydrogen peroxide and an organic bleach activator therefor.

The source of hydrogen peroxide is hydrogen peroxide, or may be an aqueous solution in which is placed a soluble hydrogen peroxide source selected from the alkali metal salts of percarbonate, perborate, persilicate and hydrogen peroxide adducts.

Most preferred is hydrogen peroxide, which typically is available as a 35% solution. Of the inorganic peroxides, most preferred are sodium percarbonate, and sodium perborate mono- and tetrahydrate. Other peroxygen sources may be possible, such as alkaline earth and alkali metal peroxides, monopersulfates and monoperphosphates.

The range of peroxide to activators is preferably determined as a molar ratio of peroxide to activator. Thus, the range of peroxide to each activator is a molar ratio of from about 100:1 to 1:100, more preferably about 25:1 to 1:25 and most preferably about 1:1 to 10:1. This is also the definition of a bleach effective amount of the hydrogen peroxide source. It is preferred that this activator peroxide composition provide about 0.005 to 100 ppm peracid A.O., more preferably about 0.01 to 50 ppm peracid A.O., and most preferably about 0.01 to 20 ppm peracid A.O., in aqueous media.

A description of, and explanation of, A.O. measurement is found in the article of Sheldon N. Lewis, "Peracid and Peroxide Oxidations," In: *Oxidation*, 1969, pp. 213–258, which is incorporated herein by reference. Determination of the peracid can be ascertained by the analytical techniques taught in *Organic Peracids*, (Ed. by D. Swern), Vol. 1, pp. 501 et seq. (Ch.7) (1970), incorporated herein by reference.

The organic bleach activator is typically a carbonyl-containing compound. These activators react with the source of hydrogen peroxide to provide a corresponding peracid. Among the carbonyl compounds are, without limitation, esters, nitriles, imides, oximes, carboxylic acids, acid anhydrides, and the like, which, in the presence of a source of hydrogen peroxide react to form a corresponding organic peracid.

Esters are preferred activators. One group of such activators is phenol esters. The-substituted phenol esters are described in great detail in Bolkan et al., U.S. Pat. No. 5,002,691, Chung et al., U.S. Pat. No. 4,412,934, Thompson et al., U.S. Pat. No. 4,483,778, Hardy et al., U.S. Pat. No. 4,681,952, Fong et al., U.S. Pat. Nos. 4,778,618 and 4,959,187, Rowland et al., published EP 390,393, all of which are incorporated herein by reference thereto.

Other examples of phenol esters are those described in U.S. Pat. Nos. 4,778,618 and 4,959,187 and EP 390,393, which refer to substituted phenyl esters known as alkanoyloxyglycoylbenzene (also known as alkanoyloxyacetyloxybenzene), further abbreviated as "AOGB," and alkanoyloxyglycoylphenyl sulfonate (also known as alkanoyloxyacetyloxyphenyl sulfonate), further abbreviated as "AOGPS."

The first compound, AOGB, has the structure:

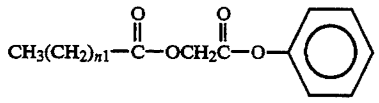

wherein $n_1$ is preferably 0–20.

The second compound, AOGPS, has the structure:

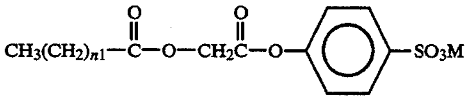

wherein $n_1$ is preferably 0–20, and M is H, alkali metal or ammonium cation.

AOGB/AOGPS preferably have an alkyl group with a carbon chain length of $C_{1-20}$, more preferably $C_{4-12}$. The latter chain lengths are known to result in surface active peracids, which apparently perform better at the fabric surface than more soluble peracids, such as peracetic acid. Particularly preferred AOGB/AOGPS compounds include hexanoyloxyglycoylbenzene, heptanoyloxyglycoylbenzene, octanoyloxyglycoylbenzene, nonanoyloxyglycoylbenzene, decanoyloxyglycoylbenzene, undecanoyloxyglycoylbenzene, and mixtures thereof; and hexanoyloxyglycoylphenyl sulfonate, heptanoyloxyglycoylphenyl sulfonate, octanoyloxyglycoylphenyl sulfonate, nonanoyloxyglycoylphenyl sulfonate, decanoyloxyglycoylphenyl sulfonate, undecanoyloxyglycoylphenyl sulfonate, and mixtures thereof. Other, non-surface active homologs, such as phenoyloxyglycoylbenzene and compounds depicted in Zielske et al, U.S. Pat. Nos. 4,956,117 and 4,859,800, and Zielske, U.S. Pat. No. 4,957,647, incorporated herein by reference thereto, may also be useful herein. It was surprisingly found that AOGB and AOGPS have proficient soil removal performance on fabrics.

It has been found that the AOGB type esters are more easily soluble in dense carbon dioxide gas. Because of such observed phenomenon, it is expected that these types of esters may work more proficiently in a bulk medium, i.e., with a large amount of fabric (e.g., soiled clothing) in a large volume of carbon dioxide dense gas. The AOGPS type activator, being less soluble in $CO_2$ dense gas, is expected to work more proficiently when applied directly to the stain/soil.

Where either type activators are used, then their solubility characteristics may be modified or manipulated by the use of emulsifiers, such as surfactants, hydrotropes, or other suitable, dispersing aids. See also, Kirk-Othmer, *Encyclopedia of Chemical Technology*, Third Edition, Vol. 22, pages 347–387, and *McCutcheon's Detergents and Emulsifiers*, North American Edition, 1983, which are incorporated herein by reference.

Further adjuncts may be useful herein. For example, buffers could be used to adjust the pH of the perhydrolysis environment. It is, for example, known that modifying pH conditions can improve perhydrolysis or performance of the formed peracids. See., E.P. 396,287, incorporated herein by reference.

Other compounds of interest herein are alkanoyloxybenzene, sometimes referred to as "AOB." This compound has the structure:

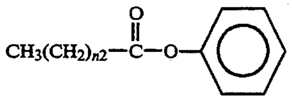

wherein $n_2$ is preferably 0–20.

Still more compounds of interest are alkanoyloxybenzene sulfonate, sometimes referred to as "AOBS," with the structure shown below.

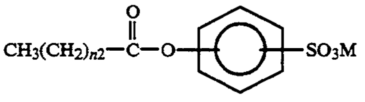

wherein $n_2$ is preferably 0–20, and M is H, alkali metal or ammonium cation.

Yet other, useful activators are expected to include simple alkyl esters, such as, without limitation, methyl acetate, methyl propionate, methyl butyrate, methyl pentanoate, methyl hexanoate, methyl heptanoate, methyl octanoate, methyl nonanoate, methyl decanoate, methyl undecanoate and methyl dodecanoate, and other alkyl esters such as, without limitation, ethyl, propyl, butyl, pentyl, hexyl, heptyl, octyl, phenyl, acetate and other ester nuclei. These types of esters are not ordinarily expected to provide good perhydrolysis in the absence of a catalyst, e.g., a lipase, or the like. See, Weyn, U.S. Pat. No. 3,974,082, incorporated herein by reference.

Additionally, other organic activators useful in the practice of this invention include the products of enzymatic perhydrolysis.

In enzymatic perhydrolysis, an esterolytic enzyme, e.g., esterase, lipase (see U.S. Pat. No. 5,030,240 and E.P. 253,487, incorporated herein by reference) or a protease (see EP 359,087, incorporated herein by reference), is combined with a source of hydrogen peroxide and a substrate, therefor, which, in combination with the enzyme and hydrogen peroxide, will produce peracid. The substrate is a chemical which, in combination with the hydrogen peroxide and the selected enzyme generates at least a significant amount of peracid of greater than about 0.5 ppm A.O. The enzymatically generated peracid is distinct from chemical perhydrolysis, which is the reaction of a bleach activator (typically, an ester) with hydrogen peroxide to produce peracid. Generally, the substrate and the hydrogen peroxide will not produce any discernible peracid in the absence of the enzyme.

Exemplary substrates include:

(a) when the enzyme is a lipase or esterase:

(i) glycerides having the structure

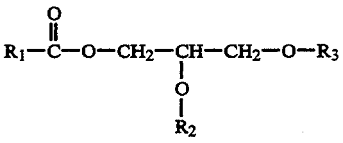

wherein $R_1=C_{1-12}$, and $R_2$, $R_3=$ $$-\overset{\overset{\displaystyle O}{\|}}{C}-C_{1-12}$$

or (ii) an ethylene glycol derivative or ethoxylated ester having the structure $$R_1-\overset{\overset{\displaystyle O}{\|}}{C}-O-(CH_2-CH_2-O)_nH$$

wherein n=1–10 and $R_1$ is defined as above; and (iii) a propylene glycol derivative or propoxylated ester having the structure $$R_1-\overset{\overset{\displaystyle O}{\|}}{C}-O-(CH_2-\underset{\underset{\displaystyle CH_3}{|}}{CH}-O)_nH$$

wherein n and $R_1$ are defined as above.

Within the preferred structures referred to immediately above, $R_1$ is more preferably $C_{6-10}$ and most preferably $C_{8-10}$, $R_2$ and $R_3$ have more preferably a $C_{6-10}$ alkyl group and most preferably a $C_{8-10}$ alkyl group, or H.

The use of glycerides, especially diglycerides and triglycerides, is particularly preferred when the esterolytic enzyme is lipase or esterase, since diglycerides and triglycerides have more than one acyl group which can yield peracid when combined with the selected enzyme in the presence of hydrogen peroxide. Thus, glyceride may be particularly effective in achieving very efficient perhydrolysis in the presence of the lipase/esterase and a source of hydrogen peroxide.

The glyceride substrate is characterized by carboxylic acid moieties having from about one to eighteen carbon atoms. Mixtures of varying chain length glycerides are also preferred.

Exemplary triglyceride substrates are triacetin, trioctanoin, trinonanoin, tridecanoin, and tristearin.

As discussed previously, where the solubility characteristics of perhydrolysis system are desired to be modified or manipulated, then emulsifiers, such as surfactants, hydrotropes, or other suitable, dispersing aids, can be used. See again, Kirk-Othmer, *Encyclopedia of Chemical Technology,* Third Edition, Vol. 22, pages 347–387, and *McCutcheon's Detergents and Emulsifiers,* North American Edition, 1983, which are incorporated herein by reference.

Other exemplary substrates include:

(b) when the enzyme is a protease:

$$R'-Z-\overset{\overset{\displaystyle O}{\|}}{C}-O-(CH_2)_n-X$$

wherein $R'=C_{1-10}$ alkyl; Z=0, $(CH_2CH_2O)_m$-, $$(\underset{\underset{\displaystyle CH_3}{|}}{CH}-CH_2O)_m-,$$

NH, $SO_2$, or NR″ (wherein m=0–10 and R″=phenyl or $C_{1-4}$ alkyl); n=2–10; X=OH, —OR″ or —NR″$_2$; and X may be pendent on or terminate the hydrocarbyl chain.

Exemplary substrates here include $C_{1-10}$ alkyl esters, e.gs, methyl octanoate, methyl acetate; substituted esters, e.gs., methylmethoxyacetate, (2-hexyloxyethoxy) acetic acid, (2-hydroxypropyl) ester, 2-hydroxypropyloctanoate.

Thus, the perhydrolysis system can be broadly defined herein as either (a) an organic compound, such as an ester, which reacts with hydrogen peroxide to form a corresponding peracid; or (b) a substrate for an esterolytic enzyme, which, in the presence of the designated enzyme and hydrogen peroxide produces peracid enzymatically.

In the practice of the best mode of this invention, reference is conveniently made to the drawing, FIG. 1, which is a schematic depiction of the dry cleaning process and equipment suited thereto.

Figure 1:
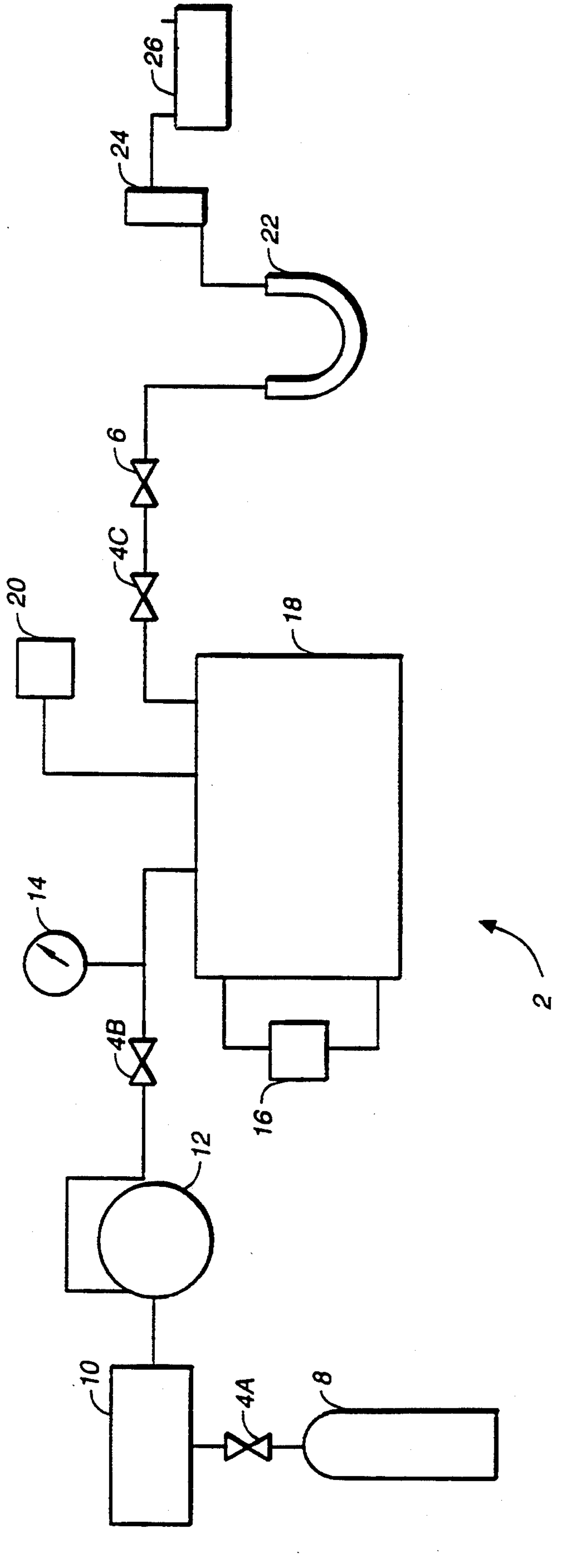
In FIG. 1 is generally depicted the dry cleaning operation 2. A pressurized gas cylinder 8 contains densified $CO_2$, whose outflow can be regulated by in-line valve 4A. The gas cylinder is connected by means of tubing to pump 10, e.g, an electrically driven LDC pump, which pressurizes the $CO_2$ along with regulator 12. A further valve 4B passes densified $CO_2$ to be read by pressure gauge 14. The densified $CO_2$ is fed into autoclave 18, in which the soiled fabrics are placed. The temperature of the densified $CO_2$ is controlled by a heat exchange coil 16 located in autoclave 18. The temperature is measured by a digital thermometer 20 connected to a thermocouple (not shown). The densified $CO_2$ and soil is then passed through valve 4C which is in line with heated control valve 6, which controls the extraction rate. Further downstream, an expansion vessel 22 collects the extracted soils, while flow gauge 24 measures the rate of extraction. The gas meter 26 measures the volume of $CO_2$ used.

Using the operation outlined above, extractions of soils were undertaken using a preferred embodiment of the invention, in which the stained fabric was contacted with AOGB or AOGPS and hydrogen peroxide with dense $CO_2$ in a reaction chamber.

EXPERIMENTAL

In order to ascertain whether perhydrolysis (and therefore, bleaching) was actually being achieved, two separate organic bleach activator compounds representative of AOGB and AOGPS were contacted on wool swatches. (Wool is a frequently dry-cleaned fabric since aqueous washing and drying often leads to shrinkage of such fabrics.) The respective compounds were nonanoyloxyglycoylbenzene ("NOGB") and nonanoyloxyglycoylphenyl sulfonate ("NOGPS"). The swatches were previously stained with spaghetti sauce, coffee, grass and clay, to provide a series of "diagnostic" stains. Effectiveness of the invention could therefore be assayed by comparing performance against this broad spectrum of cleaning challenges.

A 300 ml chamber was used. The swatches were placed in two separate batches or runs for each treatment in order to obtain reproduceable results. The chambers were then filled with dense carbon dioxide to 2,500 psi at 20° C. and the reaction allowed to take place for 1 hour. In the TABLE below, comparisons were made among $CO_2$ alone, $CO_2$ and $H_2O_2$, and $CO_2$/-$H_2O_2$/activator. In the data, stain removal is indicated as % stain removal versus untreated, stained swatches.

TABLE

| Treatment | Stain | | | |
|---|---|---|---|---|
| | Spaghetti Sauce | Coffee | Grass | Clay |
| $CO_2$ | 37 | 4 | 6 | 9 |
| $CO_2/H_2O_2$ | 47 | 8 | 7 | 34 |
| $CO_2/H_2O_2/$ NOGB | 64 | 14 | — | — |
| $CO_2/H_2O_2/$ NOGPS | 59 | 42 | 37 | 58 |

The foregoing results demonstrate the unexpected benefits of the inventive cleaning composition and method over the use of dense $CO_2$ used singly or in combination with $H_2O_2$.

However, It is to be understood that this invention is not limited to these examples. The invention is further illustrated by reference to the claims which follow below, although obvious embodiments and equivalents are covered thereby.

We claim:

1. A cleaning composition comprising a combination of cleaning-effective amounts of dense gas, said dense gas being selected from the group consisting of densified carbon dioxide, supercritical carbon dioxide, liquid carbon dioxide NH3 and lower alkanes, a source of hydrogen peroxide and an organic bleach activator therefor.

2. The cleaning composition of claim 1 wherein said dense gas is densified carbon dioxide.

3. The cleaning composition of claim 2 wherein said densified carbon dioxide has a pressure, at room temperature, of greater than 800 psi.

4. The cleaning composition of claim 1 wherein said source of hydrogen peroxide is selected from hydrogen peroxide or an inorganic peroxide.

5. The cleaning composition of claim 4 wherein said source of hydrogen peroxide is hydrogen peroxide.

6. The cleaning composition of claim 1 wherein said organic bleach activator is a carbonyl compound.

7. The cleaning composition of claim 6 wherein said organic bleach activator is an ester.

8. The cleaning composition of claim 7 wherein said organic bleach activator is a substituted phenol ester.

9. The cleaning composition of claim 8 wherein said organic bleach activator is an alkanoyloxybenzene.

10. The cleaning composition of claim 8 wherein said organic bleach activator is an alkanoyloxyglycoylbenzene.

11. The cleaning composition of claim 10 wherein said alkanoyloxyglycoylbenzene has the structure:

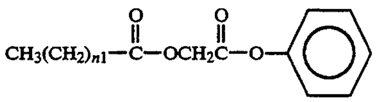

wherein $n_1$ is 0–20.

12. The cleaning composition of claim 8 wherein said organic bleach activator is an alkanoyloxyglycoylphenylsulfonate.

13. The cleaning composition of claim 12 wherein said alkanoyloxyglycoylphenyl sulfonate has the structure:

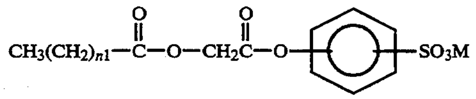

wherein $n_1$ is 0–20, and M is H, alkali metal or ammonium cation.

14. The cleaning composition of claim 1 further comprising a dispersant/emulsifier selected from the group consisting of surfactants, hydrotropes and mixtures thereof.

15. The cleaning composition of claim 6 wherein said organic bleach activator comprises the products of enzymatic perhydrolysis.

16. The cleaning composition of claim 15 wherein said products of enzymatic perhydrolysis are generated by combining an esterase and a substrate therefor in the presence of said hydrogen peroxide to produce peracid.

17. The cleaning composition of claim 16 wherein said esterase is lipase.

18. The cleaning composition of claim 15 wherein said products of enzymatic perhydrolysis are generated by combining an protease and a substrate therefor in the presence of said hydrogen peroxide to produce peracid.

19. The cleaning composition of claim 1 further comprising a buffer for pH modification or maintenance.

* * * * *